United States Patent
Ichikawa

(10) Patent No.: US 7,587,195 B2
(45) Date of Patent: Sep. 8, 2009

(54) WIRELESS COMMUNICATIONS APPARATUS MADE OPERATIVE IN DEPENDENT UPON A RECEIVED SIGNAL STRENGTH

(75) Inventor: Takeshi Ichikawa, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 534 days.

(21) Appl. No.: 11/391,328

(22) Filed: Mar. 29, 2006

(65) Prior Publication Data

US 2006/0252448 A1    Nov. 9, 2006

(30) Foreign Application Priority Data

Mar. 30, 2005    (JP) .............................. 2005-099188

(51) Int. Cl.
*H04B 1/16* (2006.01)

(52) U.S. Cl. .............. 455/343.1; 455/226.1; 455/67.11

(58) Field of Classification Search ... 455/343.1–343.6, 455/127.5, 574, 226.1–226.5, 67.11–67.14, 455/296, 63.1; 340/7.35
See application file for complete search history.

(56) References Cited

U.S. PATENT DOCUMENTS

| | | | | |
|---|---|---|---|---|
| 4,903,319 A | * | 2/1990 | Kasai et al. ................. | 455/574 |
| 5,487,181 A | * | 1/1996 | Dailey et al. ............... | 455/90.2 |
| 5,680,112 A | * | 10/1997 | Xydis ....................... | 455/343.2 |
| 5,765,114 A | * | 6/1998 | Fukuda ...................... | 455/574 |
| 6,100,814 A | * | 8/2000 | Doyle ....................... | 455/343.2 |
| 6,229,988 B1 | * | 5/2001 | Stapefeld et al. ........... | 340/7.35 |
| 6,263,200 B1 | * | 7/2001 | Fujimoto ................... | 455/343.5 |
| 6,597,929 B1 | * | 7/2003 | Han et al. ................... | 455/574 |
| 7,027,788 B2 | * | 4/2006 | Walley ..................... | 455/226.2 |
| 7,209,728 B2 | * | 4/2007 | Ogura ....................... | 455/343.1 |
| 7,437,132 B2 | * | 10/2008 | Hanabusa et al. ........... | 455/130 |
| 2006/0091996 A1 | * | 5/2006 | Conner et al. .............. | 340/5.64 |
| 2007/0264962 A1 | * | 11/2007 | Ueno et al. ................ | 455/343.2 |

FOREIGN PATENT DOCUMENTS

JP    09-163452    6/1997

* cited by examiner

*Primary Examiner*—Lana N Le
(74) *Attorney, Agent, or Firm*—Studebaker & Brackett PC; Donald R. Studebaker

(57) ABSTRACT

Wireless communications apparatus is provided by which power consumption is much more reduced in a wireless system composed of a base station and wireless terminal stations. The apparatus installed in the base station includes a transmitter/receiver and a controller. The transmitter/receiver compares an RSSI value indicating the received wave strength of a received wireless signal with a preset value periodically at time intervals set in a timer for defining a time to start and stop the controller. When the RSSI value indicates that the received wave strength is higher than the preset value, the controller is made operative, and then the demodulated received data of the received signal are sent to the controller. The controller operates when the preset value is set in the transmitter/receiver, and analyzes the received data when the received wave strength has exceeded the preset value.

11 Claims, 13 Drawing Sheets

WIRELESS COMMUNICATIONS APPARATUS MADE OPERATIVE IN DEPENDENT UPON A RECEIVED SIGNAL STRENGTH

BACKGROUND OF THE INVENTION

1. Field of the Invention

The present invention relates to a wireless communications apparatus for use in a base station and a wireless terminal station forming a wireless system.

2. Description of the Background Art

Recent years, the security system has been known, which uses wireless transmission between a base station including a transmitter/receiver and a terminal station including a sensor device, for example, to transmit sensor-detected information from the terminal station to the base station. For such a system, the Association of Industries and Businesses, a corporate juridical person in Japan, provides the standard for wireless communications equipment for use in the wireless stations of low-power security systems.

Wireless communications equipment for use in such a wireless station, for example, is composed of a wireless transmitter/receiver and a controller, implementing a crime prevention system or an emergency alert system. In such systems, a base station transmits and receives data to and from a wireless terminal device staying in an area covered by the base station, and repeats its receiving operation at predetermined time intervals. When the wireless terminal device intends to send data, it shall send and deliver the data to the base station during the receiving operation of the base station.

However, the wireless station of the type described above is composed of a transmitter/receiver and a controller which are adapted to transmit and receive data only when both of the transmitter/receiver and the controller are constantly operative, thus not being suitable for saving power consumption. For example, in an application in which both base and terminal stations are battery-powered, much more reduction in power consumption is required.

In Japanese patent laid-open publication No. 163452/1997, an information processor is disclosed in which it is determined whether or not the value of an electric field strength is higher than a required value to turn the wireless communication function on or off. However, in an application where the communication unit and the control unit are fabricated on semiconductor chips separated from each other, satisfactory reduction in power consumption was not attained.

SUMMARY OF THE INVENTION

It is an object of the present invention to provide wireless communications apparatus by which power consumption is much more reduced in a wireless system formed by a base station and a terminal station.

In accordance with the present invention, an apparatus for wireless communications, comprises a wireless receiver for receiving a wireless signal, and a controller connected to said wireless receiver for processing the received signal. Said wireless receiver comprises: a timer for defining time at which operation of said controller is started or stopped; a received strength signal generator for detecting received wave strength of the wireless signal received by said wireless receiver periodically at a time set in said timer, and for producing a strength signal indicating the received wave strength; a determination circuit for comparing the strength signal with a predetermined value, and for determining whether or not the strength signal indicates that the received wave strength is higher than the predetermined value; and a connecting circuit for making said controller operative when a result of determination of said determination circuit indicates that the received wave strength is higher than the predetermined value, and for sending received data demodulated from the received signal by said wireless receiver to said controller. Said controller is made operated when the predetermined value is set in said wireless receiver and when the received wave strength exceeds the predetermined value to process the received data. Said wireless receiver and said controller may preferably be fabricated on semiconductor chips different from each other.

Further, said apparatus may comprise a comparator for comparing received data by said wireless receiver with predetermined data for notifying, when a result of comparison indicates that the received data coincide with the predetermined data, said controller of the result of comparison via said connecting circuit, said comparator transferring, upon the result of comparison being obtained, the received data to said controller via said connecting circuit. Furthermore, said apparatus may further comprise: a wireless transmitter for transmitting a wireless signal; and a storing circuit for storing data to be transmitted supplied from said controller, said storing circuit sending, when the strength signal indicates that the received wave strength is lower than the predetermined value, the stored data in said storing circuit to said wireless transmitter in sequence, said storing circuit notifying, when the data to be transmitted have been sent, said controller of completion of data sending via said connecting circuit, said storing circuit storing, if there are data to successively be transmitted in said controller, the data to be successively be transmitted supplied from said controller. If said storing circuit contains no data to be transmitted, said wireless transmitter is responsive to said timer defining the time at which the operation of said controller is stopped to stop transmission operation.

The present invention also provides a method for wireless communications comprising the steps of: preparing a wireless communication apparatus including a wireless receiver for receiving a wireless signal, and a controller connected to the wireless receiver for processing the received signal; defining time at which operation of the controller is started or stopped; detecting received wave strength of the wireless signal received by the wireless receiver periodically at a time set in said step of defining time to produce a strength signal indicating the received wave strength; comparing the strength signal with a predetermined value to determine whether or not the strength signal indicates that the received wave strength is higher than the predetermined value; making the controller operative when a result of determination of said step of comparing indicates that the received wave strength is higher than the predetermined value to send received data demodulated from the received signal by the wireless receiver to the controller; and operating the controller when the predetermined value is set in the wireless receiver and when the received wave strength exceeds the predetermined value to process the received data.

Further, said method may further comprise the steps of comparing received data by the wireless receiver with predetermined data; notifying, when a result of comparison indicates that the data coincide with the predetermined data, the controller of the result of comparison; and transferring the received data to the controller when the result of comparison is obtained. Furthermore, the wireless communication apparatus further includes a wireless transmitter for transmitting a wireless signal, said method further comprising the steps of: storing data to be transmitted supplied from the controller;

sending, when the strength signal indicates that the received wave strength is lower than the predetermined value, the stored data to the wireless receiver in sequence; notifying, when the data to be transmitted have been sent, the controller of completion of data sending; and storing, if there are data to successively be transmitted in the controller, the data to be successively be transmitted supplied from the controller. If there are no data to be transmitted in said step of storing, transmission operation of the wireless transmitter in responsive to the time at which the operation of the controller is stopped.

In accordance with the present invention, such configuration is adopted that when the comparator compares a strength signal with a predetermined value periodically at time intervals set in the timer. When the determination circuit determines that the received wave strength is higher than the predetermined value based on the result of comparison, the controller is made operative and received data are transferred to the controller. Thus, the controller is operated to process the received data only when the timer is set and a strength signal is set at the wireless receiver and also when the received wave strength exceeds the predetermined value. It is therefore is possible to reduce power consumption in the system.

Further, in accordance with the present invention, a comparator is provided which compares received data of the wireless receiver with predetermined data. When the result of comparison indicates that the data coincides with the predetermined data, the comparator notifies the controller of the result of comparison, and transfers the data to the controller based on the result of comparison. It is therefore possible to continue stopping the operation of the controller if the demodulated data are not desirous data even though the received wave strength exceeds the constant value. Therefore, a required operational time of the controller can be much more reduced, and also power consumption can significantly be reduced.

Such configuration is adopted that when an RSSI value indicates that a received wave strength is lower than the predetermined value the storing circuit sends stored data to the wireless receiver in sequence. At the end of the data sending, the storing circuit notifies the controller of the completion of the data sending. If there are next data to be transmitted in the controller, the storing circuit stores next data supplied from the controller successively and continues data sending If there are no data to be transmitted, the transmitting operation will be finished in response to an expiration of the timer. An extensive reduction of power consumption can be expected.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 3:
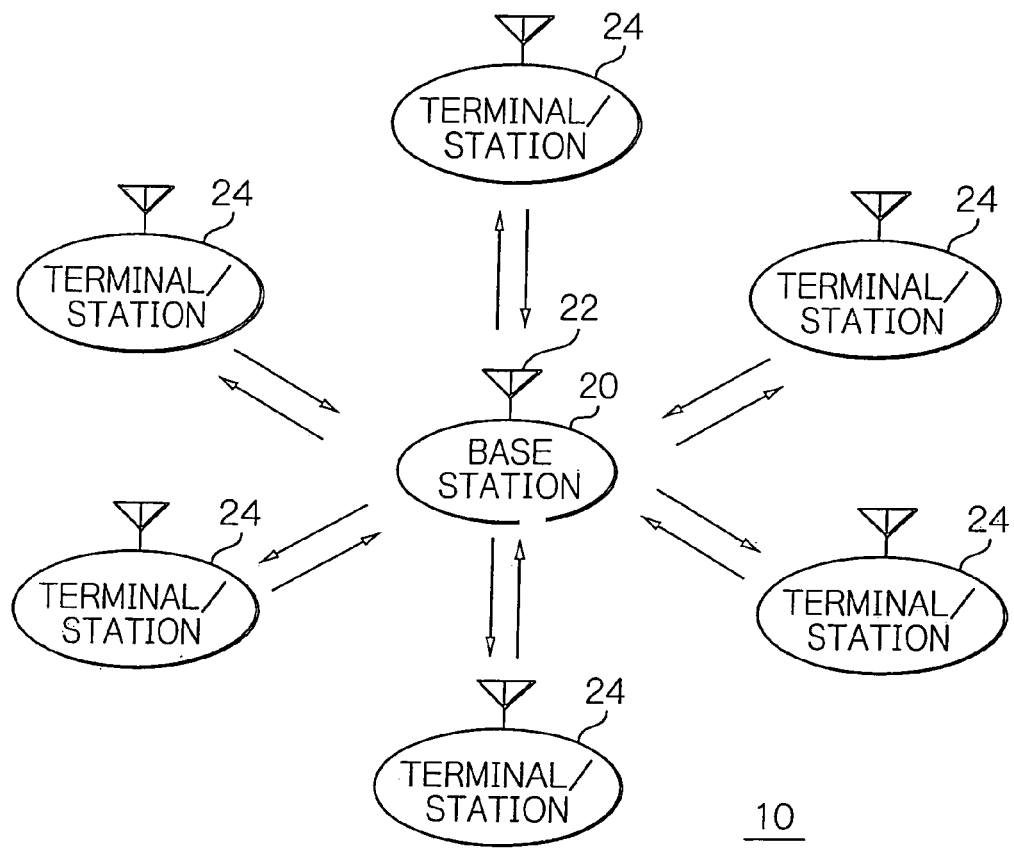
FIG. 3 is a conceptual diagram schematically showing a security network system to which the invention is applied.

At first, reference is made to FIG. 3, which shows the configuration of a security network system 10 to which the invention is applicable. The security network system 10 is implemented as, for example, wireless communication equipment for a low-power or power-saving security system. The system 10 is consists of a base station 20 which works as a master station, and plural wireless terminal stations 24 which work as slave stations adapted to receive a radio signal transmitted from an antenna 22 of the base station 20 and to transmit a radio signal to the base stations 20. The security network system 10 is a wireless communications system for alerting emergency on fires and burglaries by means of the base station 20 and wireless terminal stations 24.

As shown in FIG. 3, the base station 20 and plural wireless terminal stations 24 are interconnected by wireless transmission. Each of the wireless terminal stations 24 is provided with a sensor device or like adapted to sense unusual things and send out signal carrying information on the sensed unusualness to the base station 20. The base station 20, when receiving the signal sent from the wireless terminal station 24, raises alarm or notifies the unusualness information to other equipment by wired or wireless communication media, not shown, depending upon the content of the unusualness information. With the system 10 of the instant embodiment, the wireless terminal stations 24 are adapted to be responsive to a polling signal sent out from the base station 20 to transmit information thus detected to the base station 20, which will be received by the base station 20. Both of the base station 20 and the wireless terminal stations 24 are designed to be not only AC-powered but also battery-powered.

The wireless terminal stations 24 and base stations 20 are composed especially of low-power consumption circuitry arrangement to reduce their power consumption because of surveying unusualness, etc. Now, description will be made on the base station 20 relying upon the low-power consumption circuitry arrangement.

Figure 2:
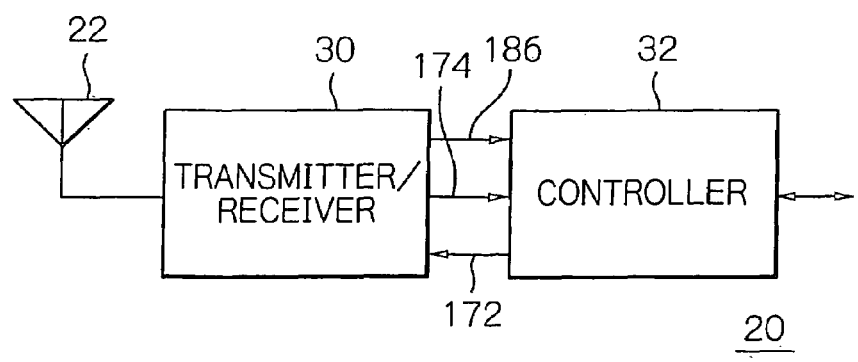
FIG. 2 is a schematic block diagram showing a base station including the transmitter/receiver in accordance with the illustrative embodiment shown in FIG. 1.

Referring to FIG. 2, which schematically showing the general structure of the base station 20 in a block diagram. As shown, the base station 20 is composed of a transmitter/ receiver 30 for wireless communication and a host controller 32. In the embodiment, the transmitter/receiver 30 and the controller 32 are fabricated on respective semiconductor chips, not illustrated, which are separate from each other. The controller 32 may be implemented by a general-purpose microprocessor in the form of semiconductor device, and has its stand-by mode, or sleep mode, for low power consumption. In the following, elements not directly pertinent to understanding the invention will be omitted from the figures and description.

Figure 1:
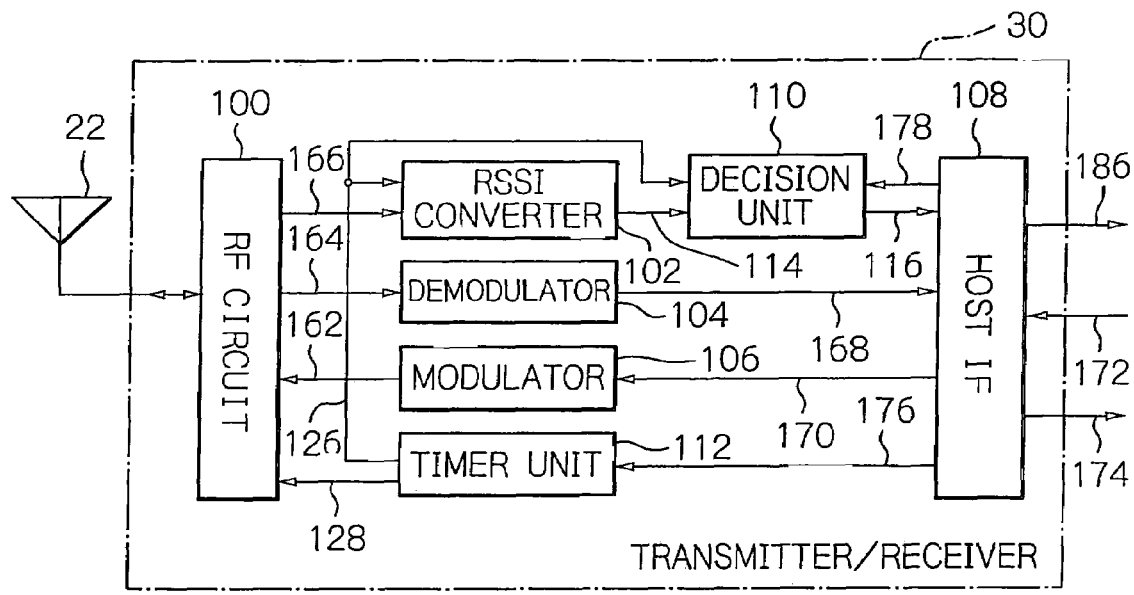
FIG. 1 is a schematic block diagram showing a preferred embodiment of a transmitter/receiver in accordance with the invention.

Well, reference will be made to FIG. 1, a schematic block diagram showing the transmitter/receiver 30. The transmitter/receiver 30 is composed of a radio frequency (RF) circuit 100 connected to the antenna 22, a received signal strength indication (RSSI) converter 102 connected to the RF circuit 100, a demodulator 104, a modulator 106 and a timer unit 112, which are interconnected as illustrated. The timer unit 112 has its output 126 interconnected to the RSSI converter 102 and a decision unit 110. The decision unit 110 is connected to the output 114 of the RSSI converter 102 and to the input 116 of a host interface (IF) 108. Signals are designated with reference number of connections on which the signals are conveyed.

The RF circuit 100 is adapted for transmitting and receiving radio wave signals. The RF circuit 100 receives transmitting data 162 supplied from the modulator 106 to transmit RF signals from the antenna 22. The RF circuit 100 catches radio wave signals carrying data to output the received data in the form of analog signals 164 to the demodulator 104, and an analog signal 166 indicating the strength of the received electromagnetic waves to the RSSI converter 102.

The RSSI converter 102 is adapted for receiving the analog signal 166 indicating the strength of a received electromagnetic wave from the RF circuit 100 and processing it in digital to output an RSSI value 114 in the form of numerical information indicating the received wave strength to the decision unit 110.

The demodulator 104 functions as demodulating the received signal 164 on an analog signal basis and processing it in digital to output the digitized signal 168 to the host interface 108. The modulator 106 is adapted to modulate the digital data 170 supplied from the host interface 108 to output a resultant signal 162 to the RF circuit 100.

The host interface 108 interfaces the controller 32, FIG. 2, and is adapted for transferring data 172 supplied from the controller 32 to the modulator 106 as the data 170 and data 168 supplied from the demodulator 104 to the controller 32 in the form of data 174. Further, the host interface has a function of transferring data 176, 178 and 116 between the timer unit 112 and decision unit 110.

Figure 4:
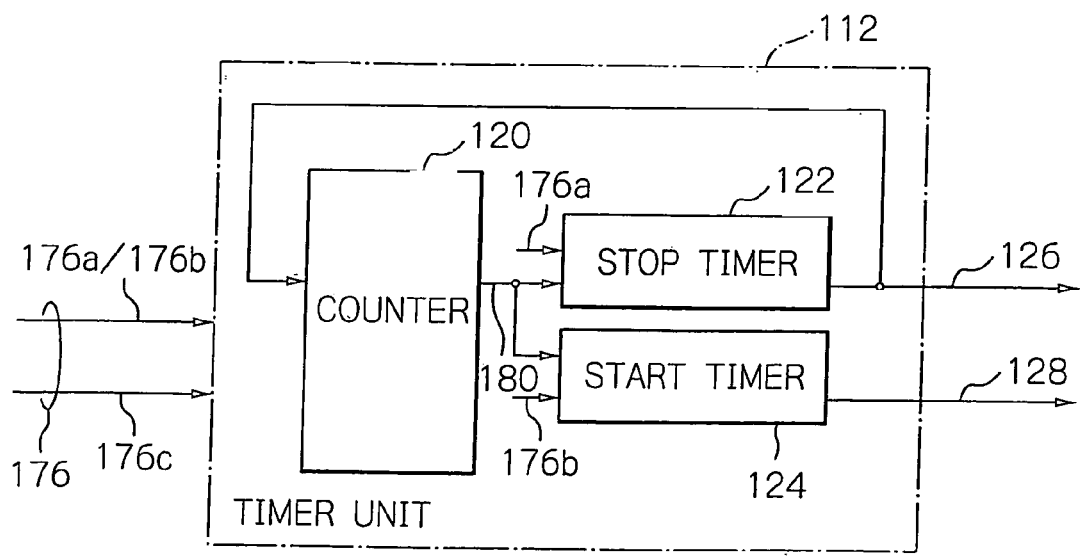
FIG. 4 is a schematic block diagram showing a timer included in the transmitter/receiver shown in FIG. 1.

As specifically shown in FIG. 4, the timer unit 112 is composed of a counter 120, a stop timer 122 and a start timer 124, which are interconnected as illustrated. The counter 120 is a incremental counter which is operative in response to an RSSI/IF disable signal 126 outputted from the stop timer 122 to reset itself to its initial value and then restart its counting.

The stop timer 122 is a timing circuit, which has a preset value set 176 via the host interface 108 in response to a write preset value signal 176c, and is thereafter responsive to a count 180 in the counter 120 coincident with the preset value 176 to output the disable signal 126. The start timer 124 is also a timing circuit, which has a preset value 176 set via the host interface 108 in response to the write preset value signal 176c, and is thereafter responsive to the count 180 in the counter 120 coincident with the preset value 176b to output an enable signal 128.

Figure 5:
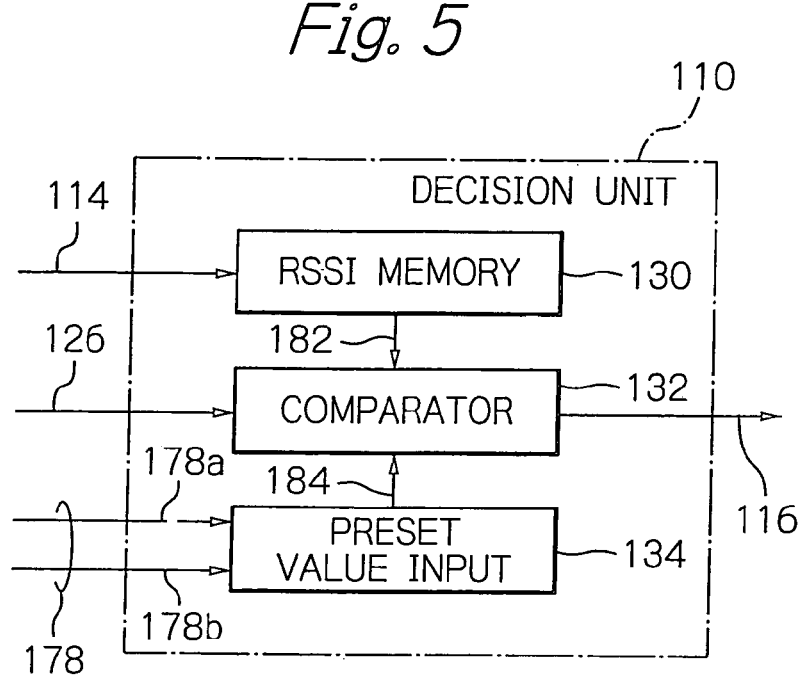
FIG. 5 is a schematic block diagram showing a decision unit included in the transmitter/receiver shown in FIG. 1.

FIG. 5 schematically shows the decision unit 110. The decision unit 110 comprises an RSSI memory circuit 130, which is adapted for being supplied with the RSSI value 114 indicating the received wave strength from the RSSI converter 102 in the transmitter/receiver 30, and storing it therein.

The decision unit 110 further comprises a comparator 132, which serves as comparing the output 182 of the RSSI memory circuit 130 with the output 184 of a preset value input circuit 134, and outputting the RSSI detection result signal 116 when the output 182 of the RSSI memory circuit 130 is larger than the present value 184. The output 116 is connected to the host interface 108, as described with reference to FIG. 1.

The preset value input circuit 134 is supplied with the preset, or comparison, value 178a to be compared with the RSSI value 182 from the host interface unit 108 in the transmitter/receiver 30 and holds the preset value 178a in response to a write preset value signal 178b to output the held value 184 to the comparator 132.

Figure 6:
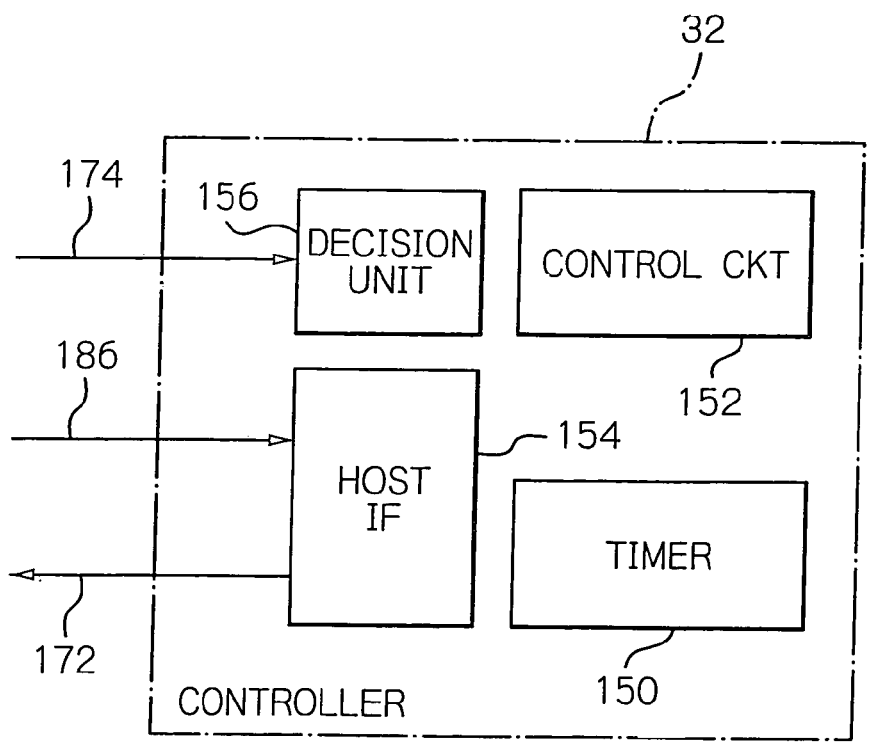
FIG. 6 is a functional block diagram illustrating the controller shown in FIG. 2.

FIG. 6 is a schematic diagram of the controller 32. As described above, the controller 32 may preferably be fabricated on a semiconductor chip different from the transmitter/receiver 30, and implemented by a general-purpose microprocessor. As seen from the figured, the controller 32 includes a timer 150, which is adapted to time a predetermined period of time and notify a control circuit 152, also included therein, of its counting termination, i.e. when it is timed up.

The control circuit 152 is controlled by the control program sequences for controlling the operation of the transmitter/receiver 30, such as data transmission and reception, turning on and off of transmission and reception and so on, to control the transmitter/receiver 30 via the host interface 154.

The controller 32 also includes a host interface 154, which is interconnected to the host interface 108 arranged in the transmitter/receiver 30 to transfer and receive transmitting and received signals and control information to and from the latter.

The controller 32 further comprises a decision unit 156, which has the function of determining whether or not the received wave strength 174 supplied from the transmitter/receiver 30 is sufficiently strong for receiving data signals to invoke, when it is determined sufficient, a receive request to the control circuit 152 to start receiving operation.

Figure 7:
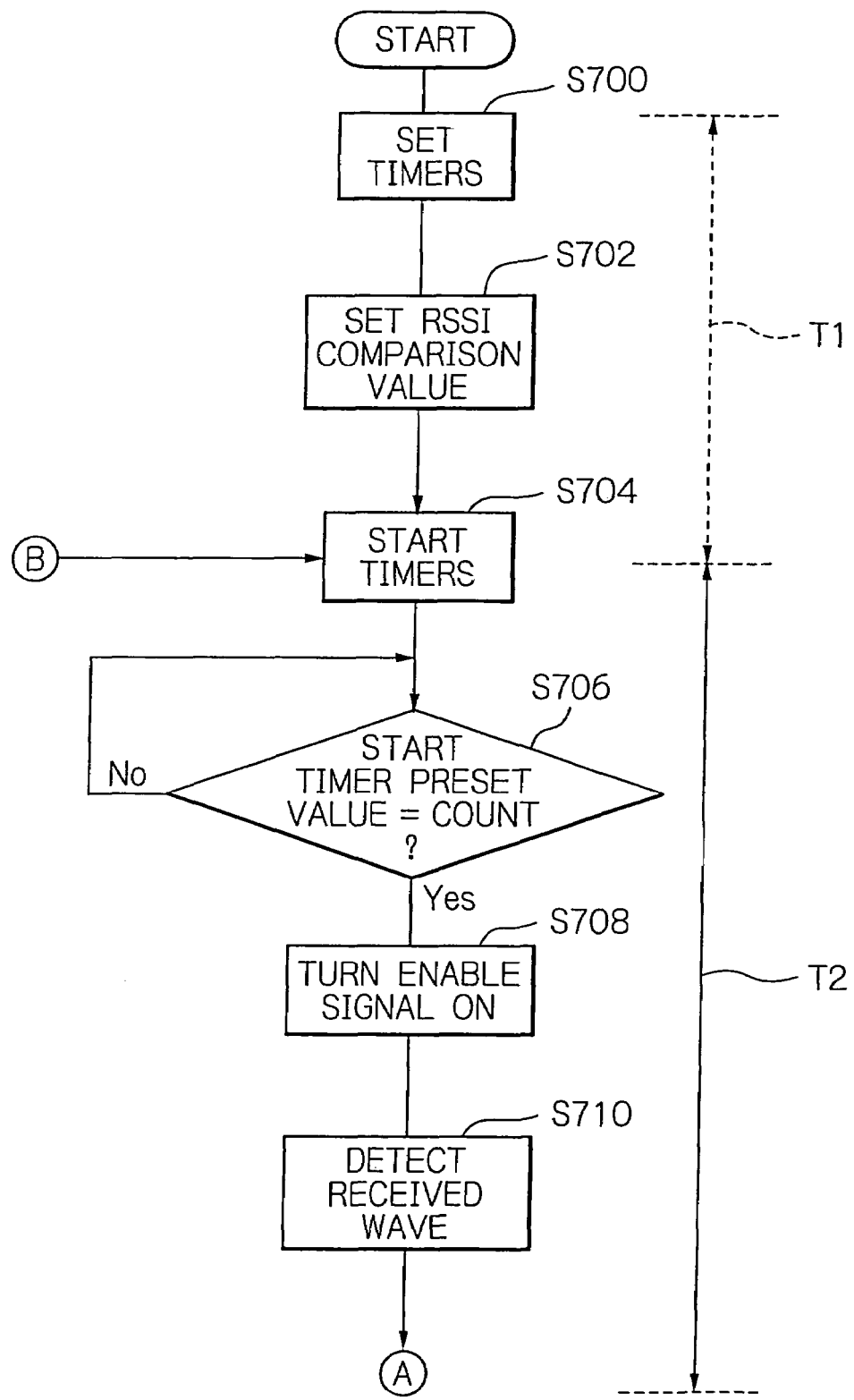
FIGS. 7 and 8 are flow charts useful for understanding an exemplified operation of the base station shown in FIG. 2.
Figure 8:
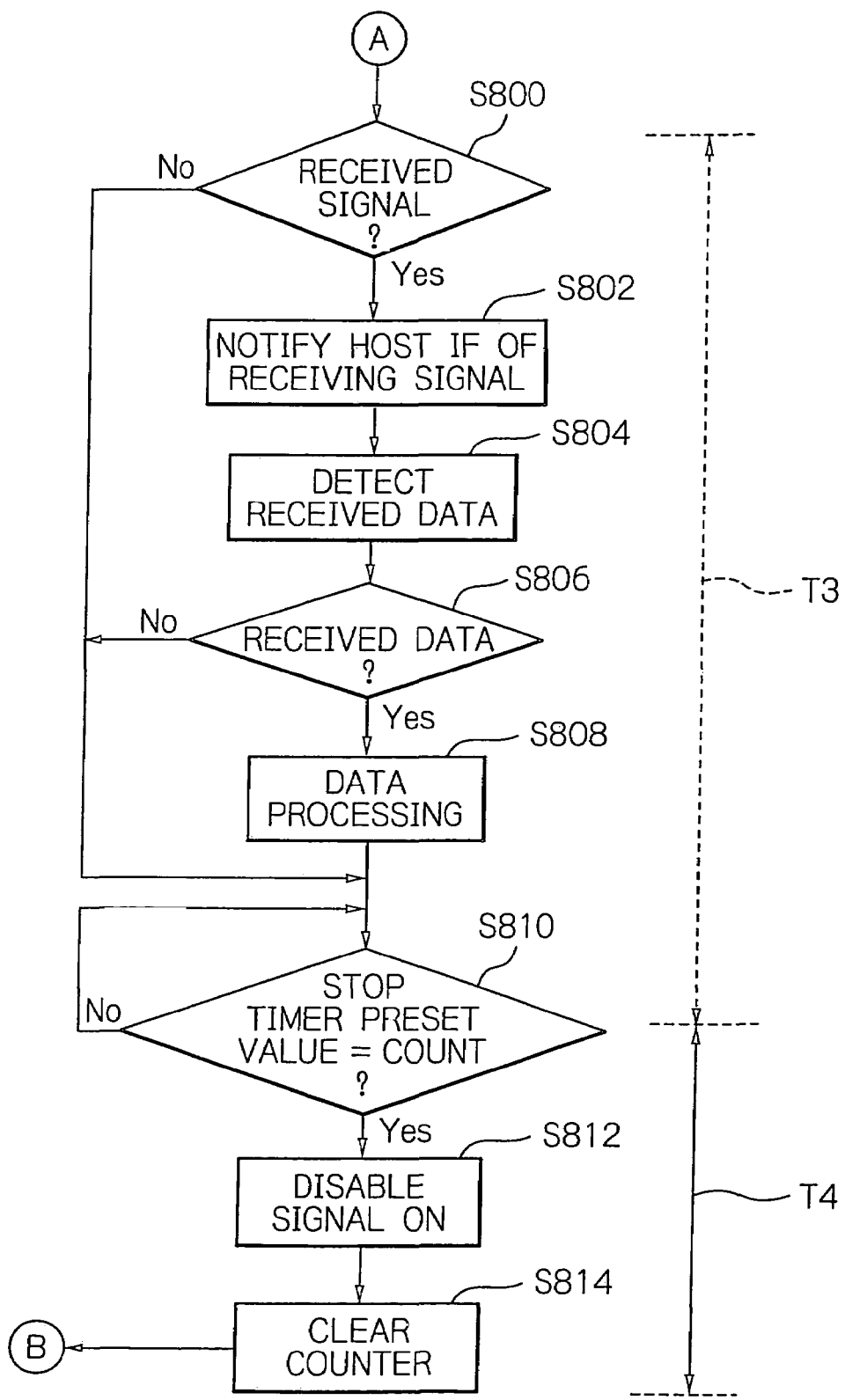

With reference to FIGS. 7 and 8, the operation of the base station 20 having above-described configuration will be described. FIGS. 7 and 8 are flow charts demonstrating the operation of the base station 20. First, in step S700, the controller 32 sets the preset values 176a and 176b to both timers 122 and 124 in the timer unit 112 of the transmitter/receiver 30. Next, in step S702, to the decision unit 110, set is the RSSI comparison value, or preset value 178a. Then, in step S704, the timer unit 112 is made operative to start its operation. At this time point, the disable signal 126 is generated by the stop timer 122 and conveyed to the controller 32 via the decision unit 110 and the host interface 108 so that the controller 32 will be in its stand-by mode, or out of operation.

In step S706, it is determined whether or not the output value 180 of the counter 120 agrees with the preset value 176b of the start timer 124, i.e. timed-up condition. When both values agree with each other (Yes), the start timer 124 will output the enable signal 128 (step S708). In response to the enable signal 128, the RF circuit 100 starts its receiving operation. In step S710, if a received wave is detected, the RF circuit 100 sends the received wave strength 166 to the RSSI converter 102.

Now, the processing goes to step S800 shown in FIG. 8. If there is received an electromagnetic wave, then the processing transfers to step S802, and otherwise to step S810. In step S802, the decision unit 110 compares. When the result of comparison indicates the RSSI value 114 exceeding the preset value 178a, then it notifies the host interface 108 of the result 116. The host interface 108 transfers the result of determination 186 to the host interface 108. In response, the controller 32 starts its operation. At the same time, the demodulator 104 sends the received data 168 to the host interface 108, which in turn sends the data 174 to the controller 32. The controller 32 detects the received data 174 and processes them in steps S804, S806 and S808.

Again, in step S800, if there is no received wave, more specifically, the decision unit 110 determines that the RSSI value 114 does not reach the preset value 178a, then the controller 32 is not notified of the result of determination 114 by the decision unit 110, and therefore continues to be disabled. Then, in step S810, when the output value 180 of the counter 120 agrees with the preset value 176a of the stop timer 122, the stop timer 122 outputs the disable signal 126 to stop the receiving operation (step S812). The controller 32 also terminates its operation. Afterwards, the counter 120 clears itself to be ready to following increment.

As described above, in the instant embodiment, periodically at the time intervals set in the timer unit 112, an RSSI value 114 is compared with the preset value 178a. If the result from the comparison shows that the received wave strength 114 is determined higher than the preset value 178a, then the controller 32 is made operative to accept the received data. That configuration allows the controller 32 to operate only during the setting of the timer unit 112 and of an RSSI comparison value in the transmitter/receiver 30 and when the received wave strength 114 exceeds the preset value 178a to analyze the received data. More specifically, in FIGS. 7 and 8, the periods of time T2 and T4, the controller 32 is in its stand-by mode, whereas in the period of time T1, it is operative, and in the period of time T3, it is operative only the answers of the decision boxes S800 and S806 are positive. It is thus possible to reduce electric power consumed in the entire system.

Figure 9:
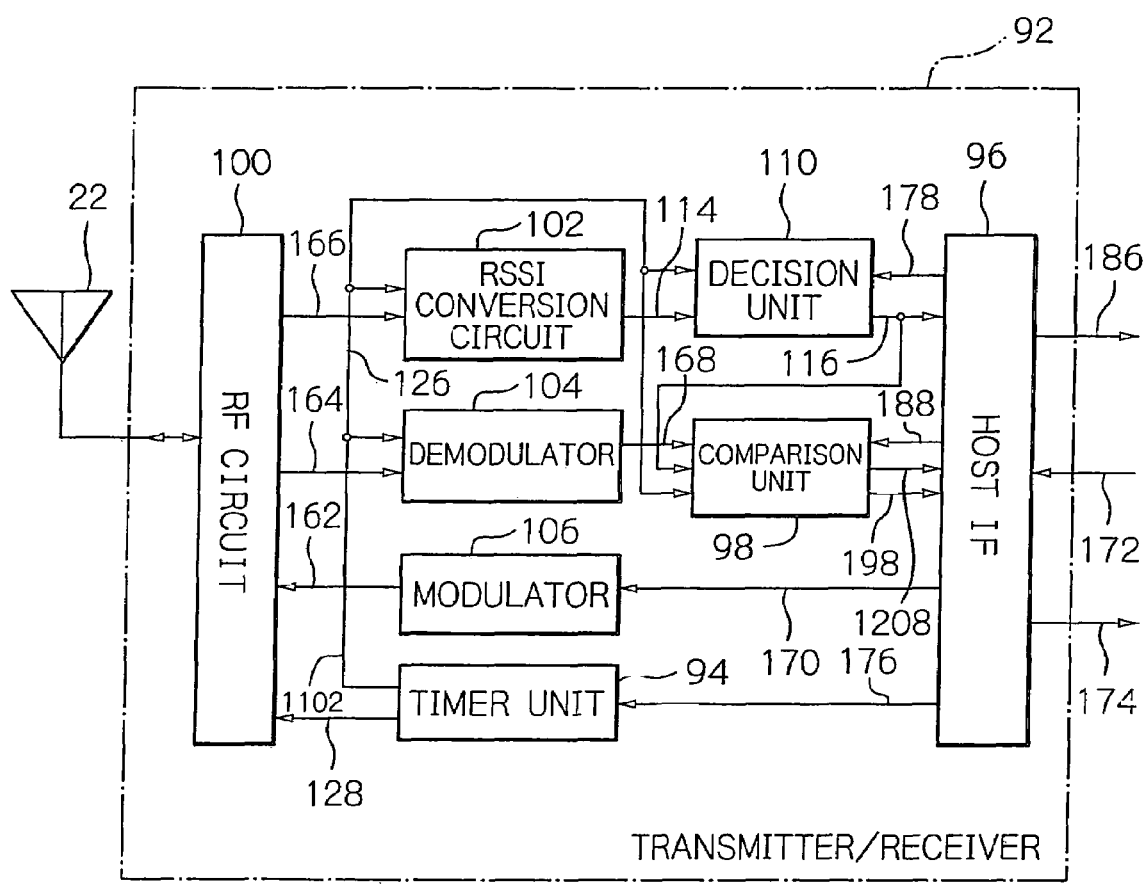
FIG. 9 is a schematic block diagram, like FIG. 1, illustrating the transmitter/receiver in accordance with an alternative embodiment of the invention.

Now, an alternative embodiment of the invention will be described, in which the base station 30 in the security network system 10, FIG. 3, includes a transmitter/receiver 92 shown in FIG. 9, in place of the transmitter/receiver 30. As shown in FIG. 9, the transmitter/receiver 92 is provided with a timer unit 94 and a host interface 96 instead of the timer unit 112 and the host interface 108 of the transmitter/receiver 30, respectively, and in addition a comparison unit 98. The host interface 96 of the alternative embodiment has a function of transferring and receiving data 188 and 1208 to and from the comparison unit 98 in addition to the same functional configuration as the host interface 108 shown in FIG. 1. In the following, like components are designated with the same reference numerals.

Figure 10:
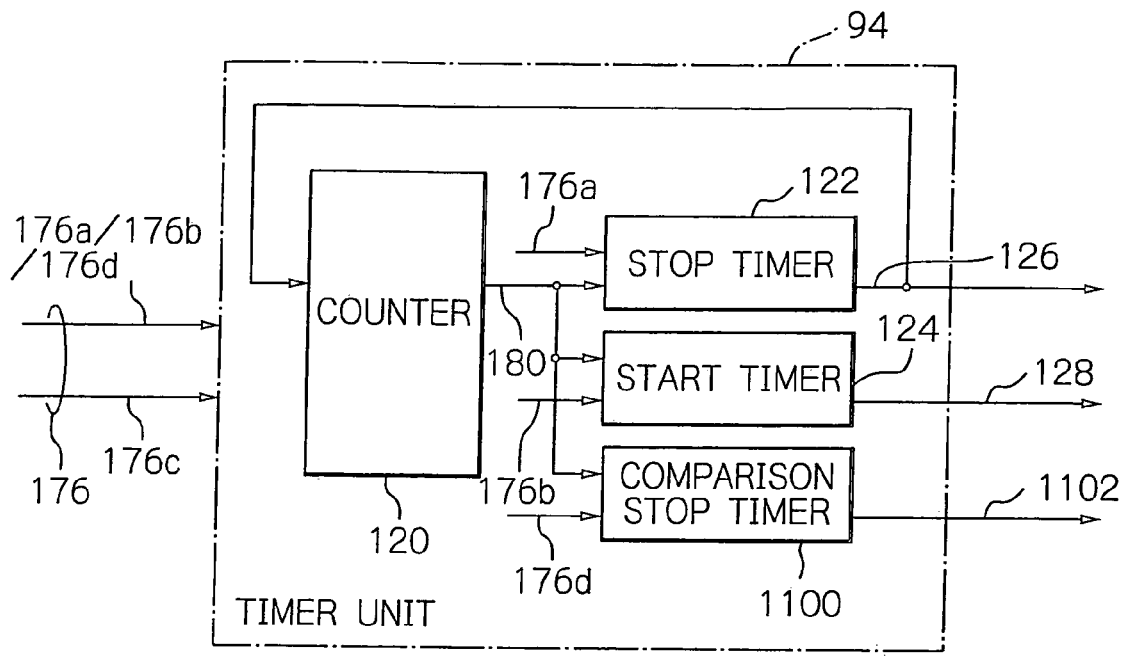
FIG. 10 is a schematic block diagram, like FIG. 4, depicting the timer included in the transmitter/receiver shown in FIG. 9.

FIG. 10 is a schematic block diagram of the timer unit 94. In addition to the constituent elements corresponding to those of the timer unit 112 shown in FIG. 4, the timer unit 94 further includes a comparison stop timer 1100. The comparison stop timer 1100 has a preset value 176d set by the controller 32 via the host interface 96, and is adapted to output a demodulator disable signal 1102 when a count 180 supplied from the counter 120 is equal to the its preset value 176d. The demodulator disable signal 1102 is supplied to the demodulator 104, the RSSI converter 102, the decision unit 110 and the comparison unit 98.

Figure 11:
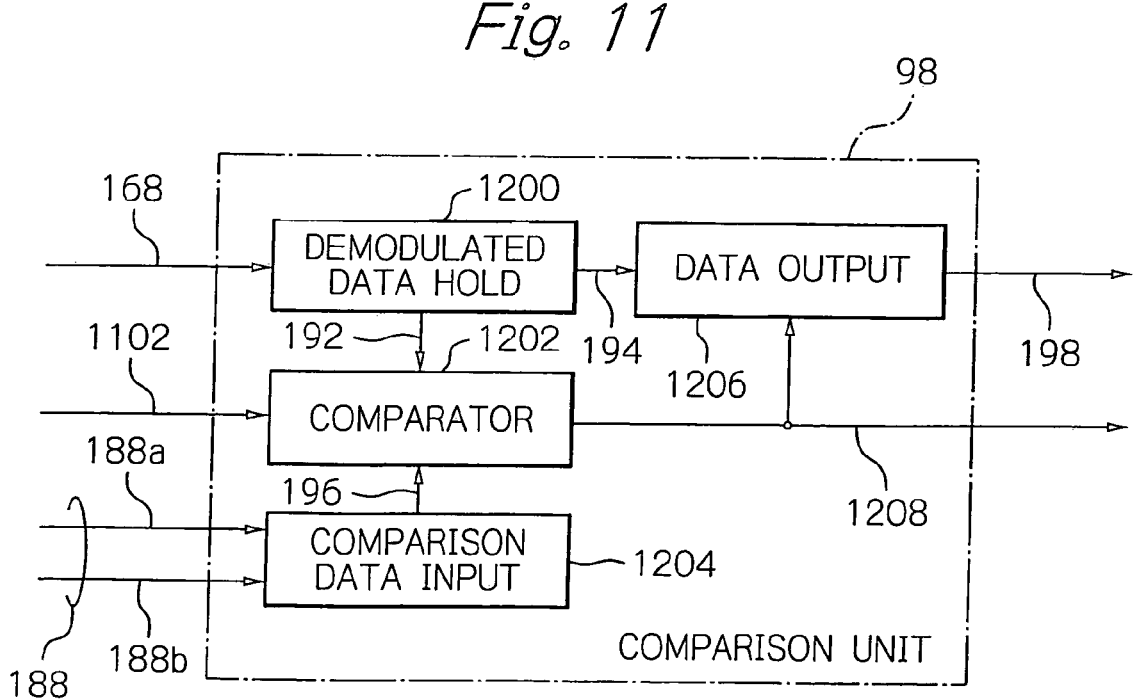
FIG. 11 is a schematic block diagram showing a comparison unit included in the transmitter/receiver shown in FIG. 9.

Next, reference will be made to FIG. 11, which schematically shows in a block diagram the comparison unit 98, which is composed of a demodulated data hold circuit 1200, a comparator 1202, a comparison data input circuit 1204 and data output circuit 1206, which are interconnected as illustrated. The demodulated data hold circuit 1200 is adapted to hold the demodulated data 168 supplied from the modulator 104, FIG. 9. The demodulated data hold circuit 1200 outputs the demodulated data held therein 192 and 194 to the comparator 1202 and the data output circuit 1206, respectively, in synchronous with its internal clock, not shown.

The comparator 1202 is adapted to compare the demodulated data 192 supplied from the demodulated data hold circuit 1200 during receiving operation with comparison data 196 supplied from the comparison data input circuit 1204. The comparator 1202 outputs, when the demodulated data 192 are consistent with the comparison data 196, the result from the comparison as a demodulated data comparison signal 1208. The output 1208 of the comparator 1202 is connected to the host interface 96, so that the result of demodulated data comparison 1208 will be sent to the controller 32.

The comparison data input circuit 1204 is a data hold circuit which has preset data 188a for comparison of demodulated data set in response to a write preset value signal 188b by the controller 32 via the host interface 96, and holds it to output the preset data 196 to the comparator 1202.

The data output circuit 1206 is responsive to the result of demodulated data comparison 1208 supplied from the comparator 1202 as its enable signal enabling output to output, when enabled, the demodulated data supplied 194 from the demodulated data hold circuit 1200 to the controller 32 via the host interface 96 as a resultant signal 198.

Figure 12:
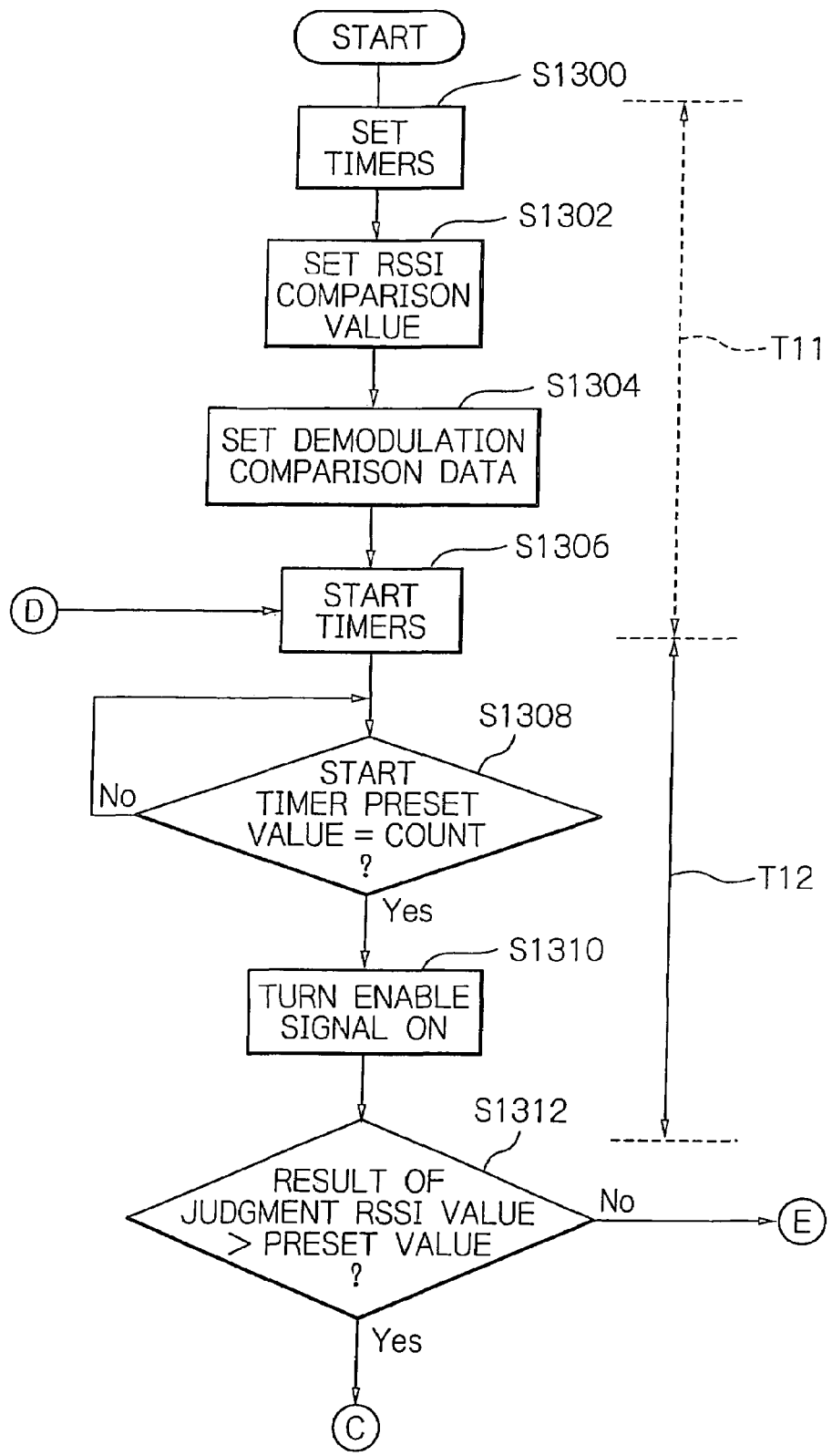
FIGS. 12 and 13 are flow charts useful for understanding an exemplified operation of the base station in accordance with the alternative embodiment.
Figure 13:
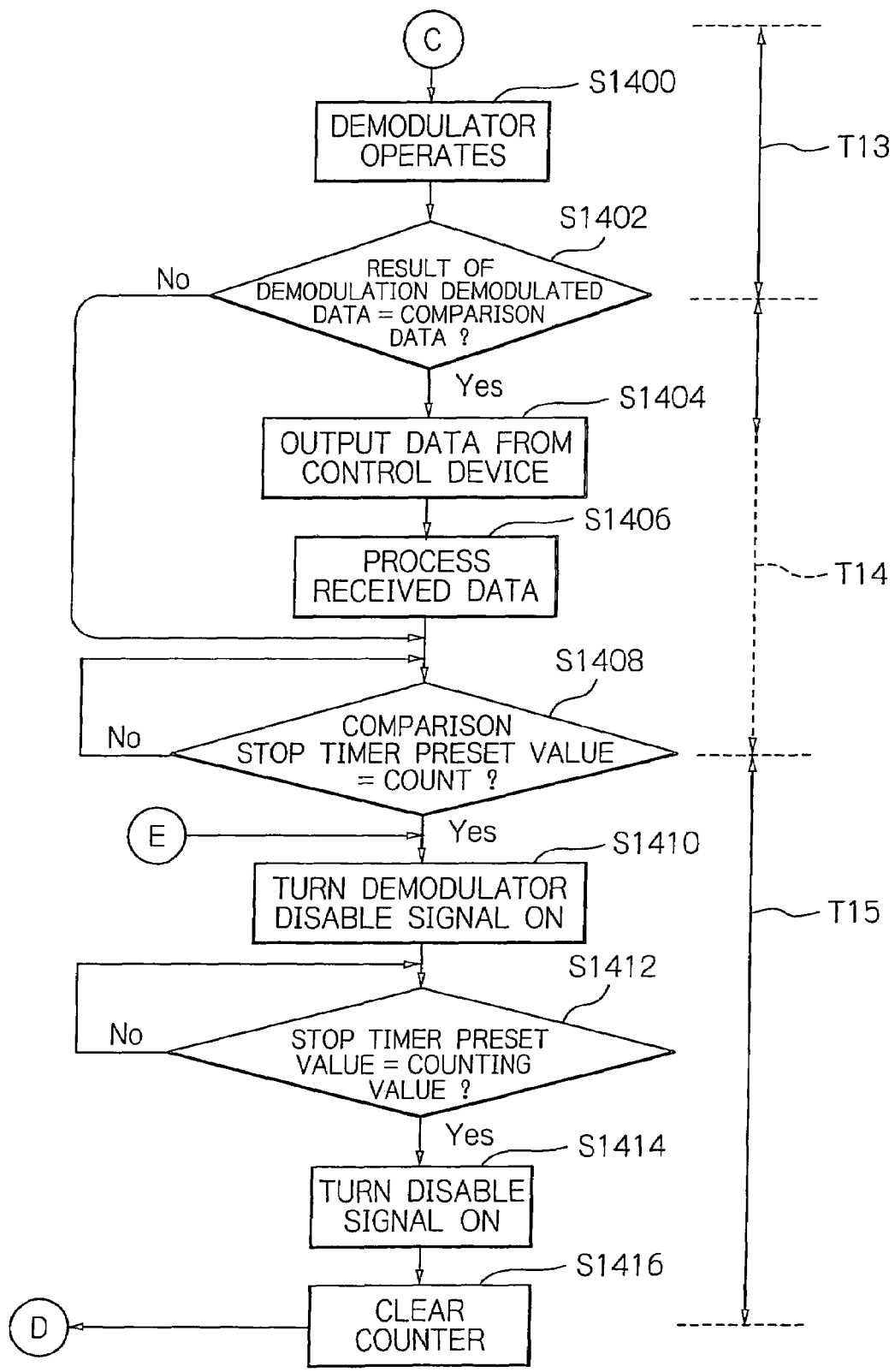

With reference to FIGS. 12 and 13, the operation of the base station 20 having the above-described configuration will be described. First, the controller 32 sets control data for the transmitter/receiver 92, more specifically, preset values 176a and 176b for the timer unit 94 (step S1300), an RSSI comparison value 188a (step S1302) and demodulation comparison data 176d (step S1302). Next, in step S1306, the operation of the timer unit 94 is started. At this time, the disable signal 126 is outputted from the stop timer 122 to the controller 32 via the decision unit 110 and the host interface 96 so that the controller 32 will be in its stand-by mode and out of operation.

When a count in the counter 120 outputted in the form of a count value 180 agrees with the preset value 176b of the start timer 124, i.e. the timer 124 reaches its full count (step S1308), the processing goes to step S1310, where the start timer 124 outputs the enable signal 128 to the RF circuit 100. In response to the enable signal 128, the RF circuit 100 starts its receiving operation, and sends the received wave strength signal 166 to the RSSI converter 102. At this time point, if the result of comparison by the decision unit 110 indicates that the RSSI value exceeds the preset value (step S1312), then the processing goes to step S1400, FIG. 13, where the demodulator 104 starts its operation to demodulate the received signals 164 and send the demodulated data 168 to the comparison unit 98. If the RSSI value does not exceed the preset value in step S1312, the processing goes to step S1410, where the demodulator 104 continues to stop due to the disable signal 126 supplied from the timer unit 94.

In response to the demodulated data 168, the comparator 1202 in the comparison unit 98 compares the output 192 of the demodulated data hold circuit 1200 with the preset data 196 of the comparison data input circuit 1204 (step S1402). When the result from the comparison indicates agreement between both of them, the comparator 1202 outputs the result of demodulated data comparison 1208 to the host interface 96. Simultaneously, the data output circuit 1206 outputs the demodulated data 198 to the host interface 96. The host interface 96 sends the demodulated data 174 to the controller 32 in response to the result of demodulated data comparison 1208 supplied from the comparator 1202.

The controller 32 receives the result of demodulated data comparison 186 from the transmitter/receiver 92, and is in turn enabled to send out the data to be transmitted to the transmitter/receiver 92 (step S1404). The controller 32 also starts processing of the received demodulated data 174 (step S1406).

Well, the processing now goes to step 1408 where if a count 180 in the counter 120 agrees with the preset value 176 of the comparison stop timer 1100, then the comparison stop timer 1100 outputs the demodulator disable signal 1102 (step S1410). In response to the demodulator disable signal 1102, the demodulator 104 and the comparison unit 98 stop their operations, and also the controller 32 stops its operation at the same time. Further, when the count in the counter 120 agrees with the preset value 176a of the stop timer 122 (step S1412), the stop timer 122 outputs the disable signal 126 to stop the receiving operation (step S1414). Thereafter, the count in the counter 120 is cleared and reset for incrementing.

As described above, in the present alternative embodiment, the RSSI value is compared with a preset value periodically at the time set in timer unit 94. If the received wave strength is detected higher than the preset value based on the result of comparison, then the demodulator 104 is made operative. Further, when the demodulated data 168 of the demodulator 104 agrees with the comparison data 188a set in the comparison unit 98, the controller 32 is notified of the result of demodulated data comparison 1208 via the host interface 96, and the demodulated data 168 of the received data are transferred to the controller 32. By that configuration, if the demodulated data are not desired one, despite of the received wave strength being higher than a preset value, the controller 32 is able to keep itself inoperative. Specifically in FIGS. 12 and 13, the controller 32 operates in the periods of time T11 and T14, in the latter of which it operates only if the result from the decision box S1402 is positive. During the time periods T12, T13 and T15, the controller 32 is made stand-by. It is therefore possible to reduce much more the operational time of the controller 32, thus realizing lower power consumption. Besides, it is possible to reduce malfunction caused by unnecessary data.

Figure 14:
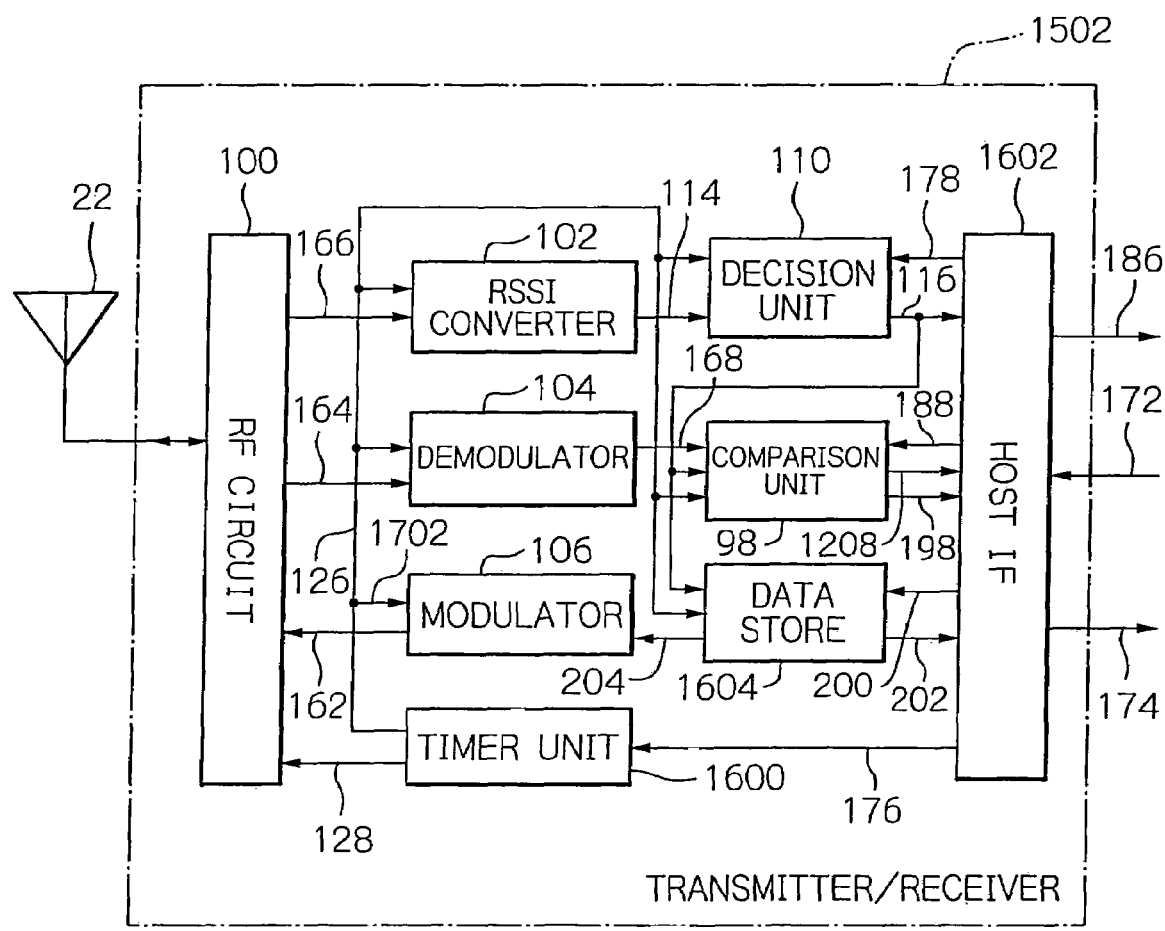
FIG. 14 is a schematic block diagram, like FIG. 1, showing the transmitter/receiver included in another alternative embodiment of the invention.

Well, another alternative embodiment of the invention will be described, in which the base station 20 comprises a transmitter/receiver 1502, FIG. 14, connected to the controller 32. Referring to FIG. 14, the transmitter/receiver 1502 includes a timer unit 1600 and a host interface 1602 in place of the timer unit 94 and the host interface 96 of the transmitter/receiver 92 shown in FIG. 9, and further includes a data store unit 1604. The host interface 1602 of this alternative embodiment has the same functional configuration as the host interface 96 shown in FIG. 9 in addition to the function of transferring and receiving data 200 and 202 to and from the data store unit 1604.

The data store unit 1604 is a memory circuit to store data 200 to be transmitted which are supplied from the controller 32 via the host interface 1602. The data store unit 1604 is adapted to automatically send stored data 204 in sequence to the modulator 106 when the transmitter/receiver 1502 shifts itself to its transmission mode. After finishing the data sending, the data store unit 1604 notifies the controller 32 of the completion of the data sending via the host interface 1602 as depicted with a connection 202 in FIG. 14.

Figure 15:
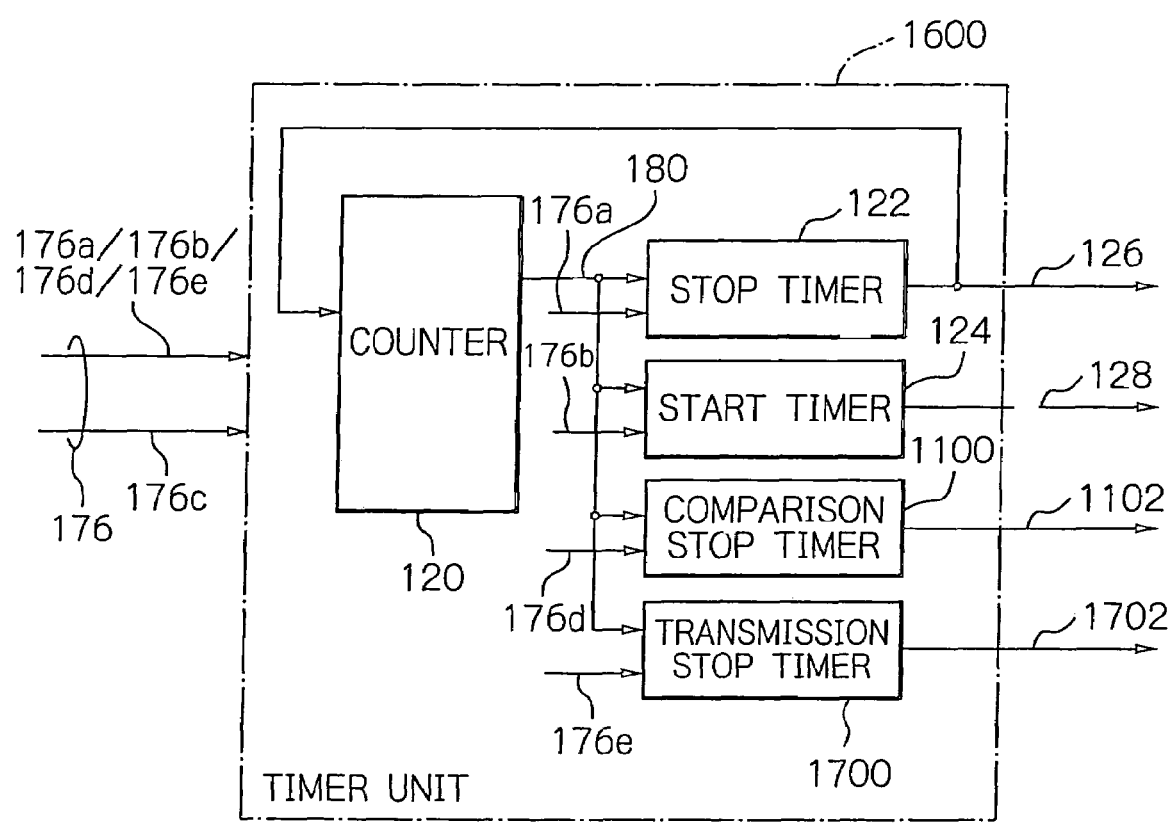
FIG. 15 is a schematic block diagram, like FIG. 4, showing the timer included in the transmitter/receiver shown in FIG. 14.

Referring to FIG. 15, the timer unit 1600 includes, in addition to the components included in the timer unit 94 shown in FIG. 10, a transmission stop timer 1700. The transmission stop timer 1700 has a preset value 176e set by the controller 32 via the host interface 1602, and is adapted to output a modulator stop signal 1702 when a count 180 supplied from the counter 120 is equal to the preset value 176e. The modulator stop signal 1702 is supplied to the modulator 106.

Figure 16:
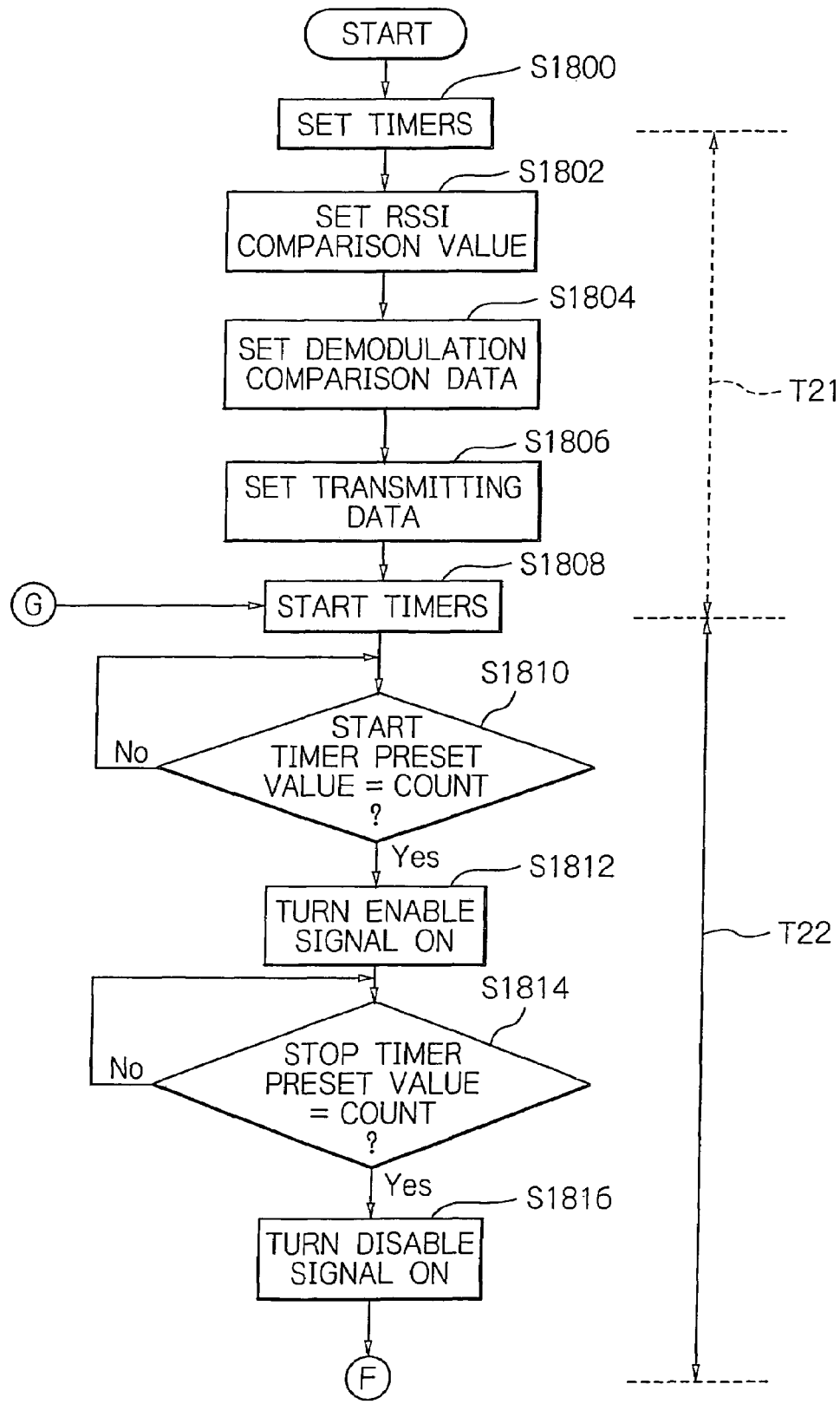
FIGS. 16 and 17 are flow charts useful for understanding an exemplified operation of the base station in accordance with the other alternative embodiment.
Figure 17:
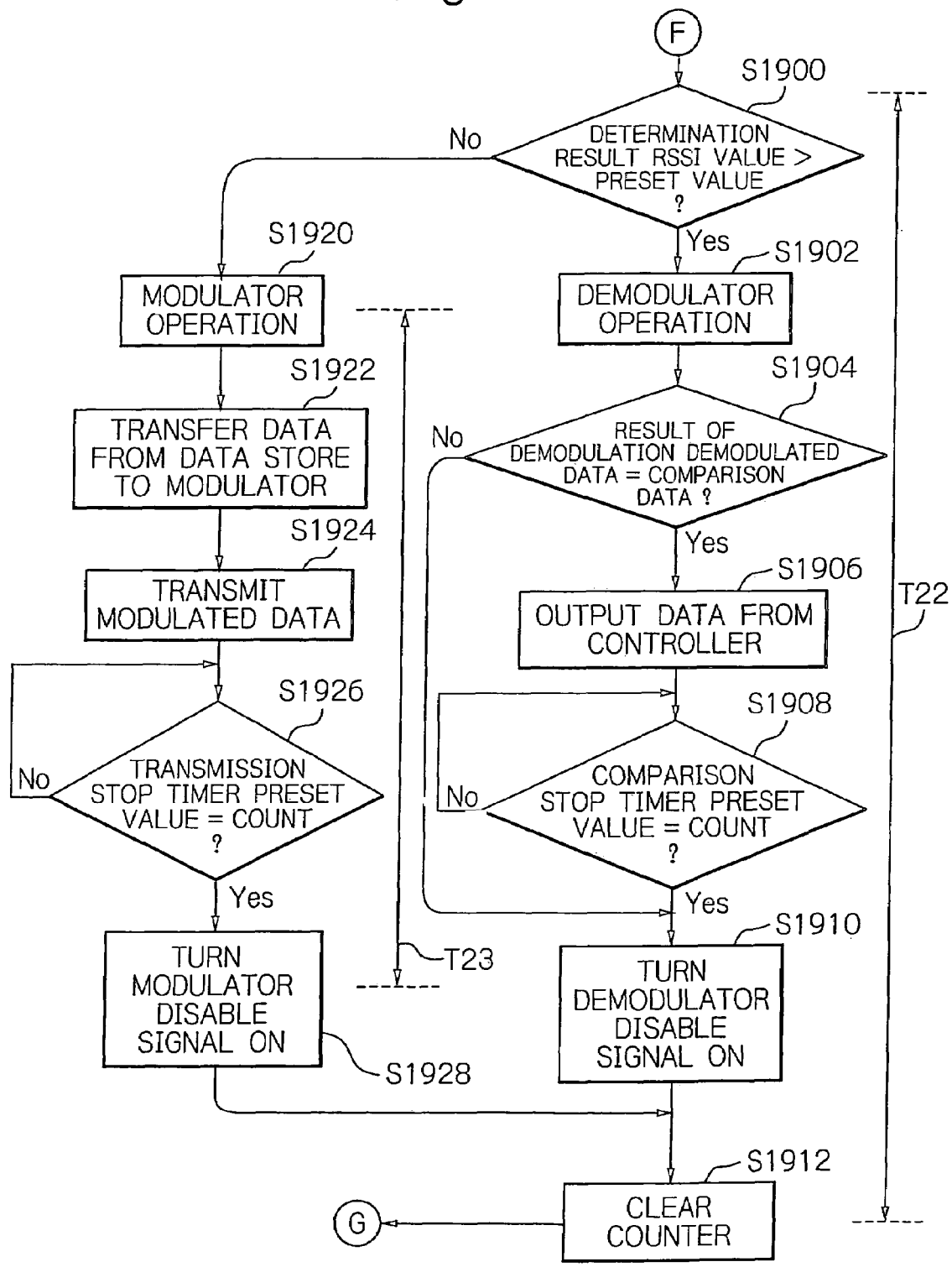

With reference to FIGS. 16 and 17, the operation of the base station 20 having the above-described configuration will be described. At first, the controller 32 sets control data for the transmitter/receiver 1500, such as values of timers (step S1800), an RSSI comparison value (step S1802), demodulation comparison data (step S1804) and transmission data (step S1806). Successively, in step S1808, the operation of the timer unit 1600 is started. At this point, the controller 32 will be in its stand-by mode and out of operation.

When a count 180 in the counter 120 is equal to the preset value 176b of the start timer 124 (step S1810), namely the counter 124 reaches its full count, the start timer 124 will output the enable signal 128 to the RF circuit 100 (step S1812). In response to the enable signal 128, the RF circuit 100 starts its receiving operation, and sends the received wave strength data 166 to the RSSI converter 102.

Next, in step S1814, when a count 180 in the counter 120 agrees with the preset value 176a of the stop timer 122, the stop timer 122 outputs the disable signal 126 to cease the receiving operation (step S1816).

Further, the control transfers to step S1900, FIG. 17, in which when the result of comparison by the decision unit 110 indicates that the RSSI value 114 exceeds the preset value 178a the demodulator 104 starts its operation to demodulate the received signals 164 and send the demodulated data 168 to the comparison unit 98.

The comparison unit 98 receives the demodulated data 168, and compares the output 192 of the demodulated data hold circuit 1200 with the preset data 196 of the comparison value data circuit 1204 (step S1904). When the comparison result indicates agreement, the comparison unit 98 issues the result of demodulated data comparison 1208 to the host interface 1602. Simultaneously, the demodulated data 198 are sent to the host interface 1602. The host interface 1602 sends the demodulated data 196 to the controller 32 in dependent upon the result of demodulated data comparison 1208 supplied from the comparison unit 98.

The controller 32 receives the result of demodulated data comparison 1208 from the transmitter/receiver 1502. The controller 32 in turn starts its operation and sends the data to be transmitted 172 to the transmitter/receiver 1502 (step S1906). The controller 32 also carries out processing on the received demodulated data 174.

Then, the processing goes to step 1908, where if a count 180 in the counter 120 reaches the preset value 176d of the comparison stop timer 1100, the comparison stop timer 1100 outputs the demodulator disable signal 1102 to the demodulator 104 (step S1910). In response to the demodulator disable signal 1102, the demodulator 104 and the comparison unit 98 stop their operations, and also the controller 32 stops its operation at the same time. Further, when a count 180 in the counter 120 agrees with the preset value 176a of the stop timer 122, the stop timer 122 outputs the disable signal 126 to stop the receiving operation. Thereafter, the counter 120 is cleared and reset for the following increment (step S1912).

In step S1900, if the RSSI value 114 does not exceed the preset value 178a, then the processing goes to step 1920 where the modulator 106 starts its operation. Successively in step S1922, the data 204 stored in the data store unit 1604 are sent to the modulator 106 in turn, and the signals 162 modulated by the modulator are supplied to the RF circuit 100 from which the radio wave signals are transmitted (step S1924).

When all of the data 204 stored in the data store unit 1604 have been sent out, the data store unit 1604 notifies the controller 32 of the completion of the data sending via the host interface 1602. If there exist data to be transmitted successively, the controller 32 urges the data store unit 1604 via the host interface 1602 and transfers the successive data to the data store unit 164. By contrast, if there are no data to be transmitted, the controller 32 halts its operation.

Further, the control goes to step 1926. In this step, when a count 180 in the counter 120 agrees with the preset value 176e of the transmission stop timer 1700, the transmission stop timer 1700 outputs the modulator stop signal 1702 to the modulator 106 and the data store unit 1604, which in turn stop the operation thereof (step S1928). Further, when a count 180 in the counter 120 agrees with the preset value 176a of the stop timer 122, the counter 120 is reset to its initial state, thus being ready for next increment (step S1912).

In summary, in the instant other alternative embodiment, an RSSI value 114 is compared with a preset value 178a periodically at the time intervals set in the timer unit 1600. When the received wave strength 114 is determined higher than the preset value 178a from the result of comparison, the same operation as the operation of the embodiment shown in FIGS. 12 and 13 is carried out. When the received wave strength 114 is determined lower than the preset value 178a, the data 204 stored in the data store unit 1604 are sent to the modulator 106 in turn, and when all of the data 204 have been sent out, the data store unit 1604 notifies the controller 32 of the completion of the data sending via the host interface 1602. Further, next data to be transmitted are successively stored in the data store unit 1604, and the controller is able to continue data sending. If there are no data to be transmitted, the transmitting operation can be halted by waiting for the expiration of the timers. Specifically, in FIGS. 16 and 17, during the time period T21 the controller 32 is operative, whereas during the time periods T22 and T23 it halts. Thus, by providing and storing data to be transmitted, it is possible to automatically determine possible timing for sending the data to send them appropriately. It is therefore possible to reduce power consumed in a system in which not only receiving operation but also transmitting operation are carried out very frequently.

The entire disclosure of Japanese patent application No. 2005-99188 filed on Mar. 30, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention. For example, the present invention is applicable to wireless terminal stations of the type that periodically detects electromagnetic waves and transmits data.

What is claimed is:

1. An apparatus for wireless communications, comprising:
a wireless receiver for receiving a wireless signal; and
a controller connected to said wireless receiver for processing the received signal;
said wireless receiver comprising:
a timer for defining time at which operation of said controller is started or stopped;
a received strength signal generator for detecting received wave strength of the wireless signal received by said wireless receiver periodically at a time set in said timer, and for producing a strength signal indicating the received wave strength;
a determination circuit for comparing the strength signal with a predetermined value, and for determining whether or not the strength signal indicates that the received wave strength is higher than the predetermined value; and
a connecting circuit for making said controller operative when a result of determination of said determination circuit indicates that the received wave strength is higher than the predetermined value, and for sending received data demodulated from the received signal by said wireless receiver to said controller,
said controller being operated when the predetermined value is set in said wireless receiver and when the received wave strength exceeds the predetermined value to process the received data.

2. The apparatus in accordance with claim 1, wherein said wireless receiver further comprises a comparator for comparing received data by said wireless receiver with predetermined data for notifying, when a result of comparison indicates that the received data coincide with the predetermined data, said controller of the result of comparison via said connecting circuit, said comparator transferring, upon the result of comparison being obtained, the received data to said controller via said connecting circuit.

3. The apparatus in accordance with claim 1, further comprising: a wireless transmitter for transmitting a wireless signal; and
a storing circuit for storing data to be transmitted supplied from said controller,
said storing circuit sending, when the strength signal indicates that the received wave strength is lower than the predetermined value, the stored data in said storing circuit to said wireless transmitter in sequence,
said storing circuit notifying, when the data to be transmitted have been sent, said controller of completion of data sending via said connecting circuit,
said storing circuit storing, if there are data to successively be transmitted in said controller, the data to be successively be transmitted supplied from said controller.

4. The apparatus in accordance with claim 3, wherein, if said storing circuit contains no data to be transmitted, said wireless transmitter is responsive to said timer defining the time at which the operation of said controller is stopped to stop transmission operation.

5. The apparatus in accordance with claim 3, further comprising semiconductor chips on which said wireless transmitter and said controller are respectively fabricated.

6. The apparatus in accordance with claim 4, further comprising semiconductor chips on which said wireless transmitter and said controller are respectively fabricated.

7. The apparatus in accordance with claim 1, further comprising semiconductor chips on which said wireless receiver and said controller are respectively fabricated.

8. A method for wireless communications comprising the steps of:
preparing a wireless communication apparatus including a wireless receiver for receiving a wireless signal, and a controller connected to the wireless receiver for processing the received signal;
defining, in the wireless receiver, time at which operation of the controller is started or stopped;
detecting, in the wireless receiver, received wave strength of the wireless signal received by the wireless receiver periodically at a time set in said step of defining time to produce a strength signal indicating the received wave strength;

comparing, in the wireless receiver, the strength signal with a predetermined value to determine whether or not the strength signal indicates that the received wave strength is higher than the predetermined value;

making the controller operative when a result of determination of said step of comparing indicates that the received wave strength is higher than the predetermined value to send received data demodulated from the received signal by the wireless receiver to the controller; and operating the controller when the predetermined value is set in the wireless receiver and when the received wave strength exceeds the predetermined value to process the received data.

9. The method in accordance with claim 8, further comprising the steps of comparing received data by the wireless receiver with predetermined data in the wireless receiver;

notifying, when a result of comparison indicates that the data coincide with the predetermined data, the controller of the result of comparison; and transferring the received data to the controller when the result of comparison is obtained.

10. The method in accordance with claim 8, wherein the apparatus further including a wireless transmitter for transmitting a wireless signal, said method further comprising the steps of:

storing data to be transmitted supplied from the controller;

sending, when the strength signal indicates that the received wave strength is lower than the predetermined value, the stored data to the wireless receiver in sequence;

notifying, when the data to be transmitted have been sent, the controller of completion of data sending; and storing, if there are data to successively be transmitted in the controller, the data to be successively be transmitted supplied from the controller.

11. The method in accordance with claim 10, further comprising the step of stopping, if there are no data to be transmitted in said step of storing, transmission operation of the wireless transmitter in responsive to the time at which the operation of the controller is stopped.

* * * * *